UNITED STATES PATENT OFFICE.

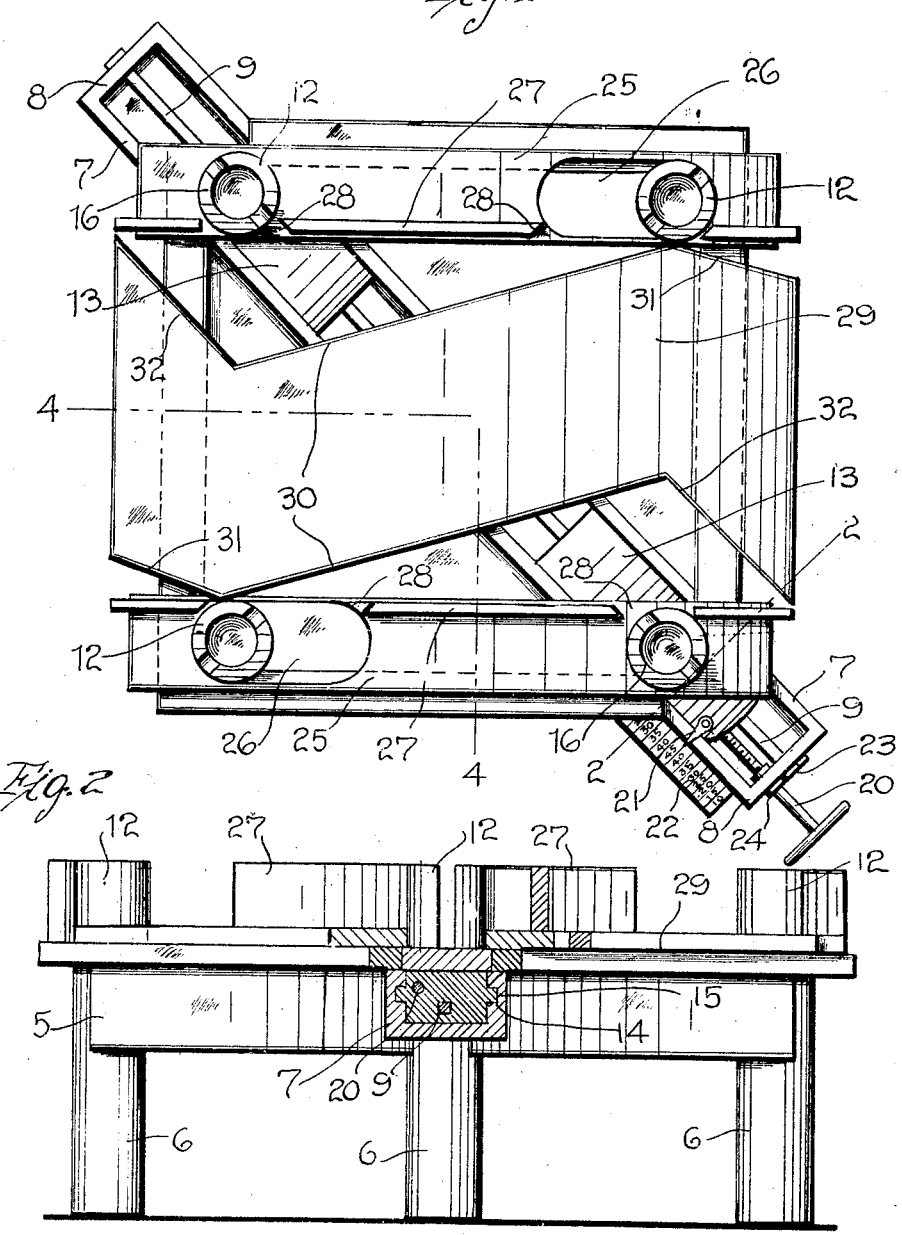

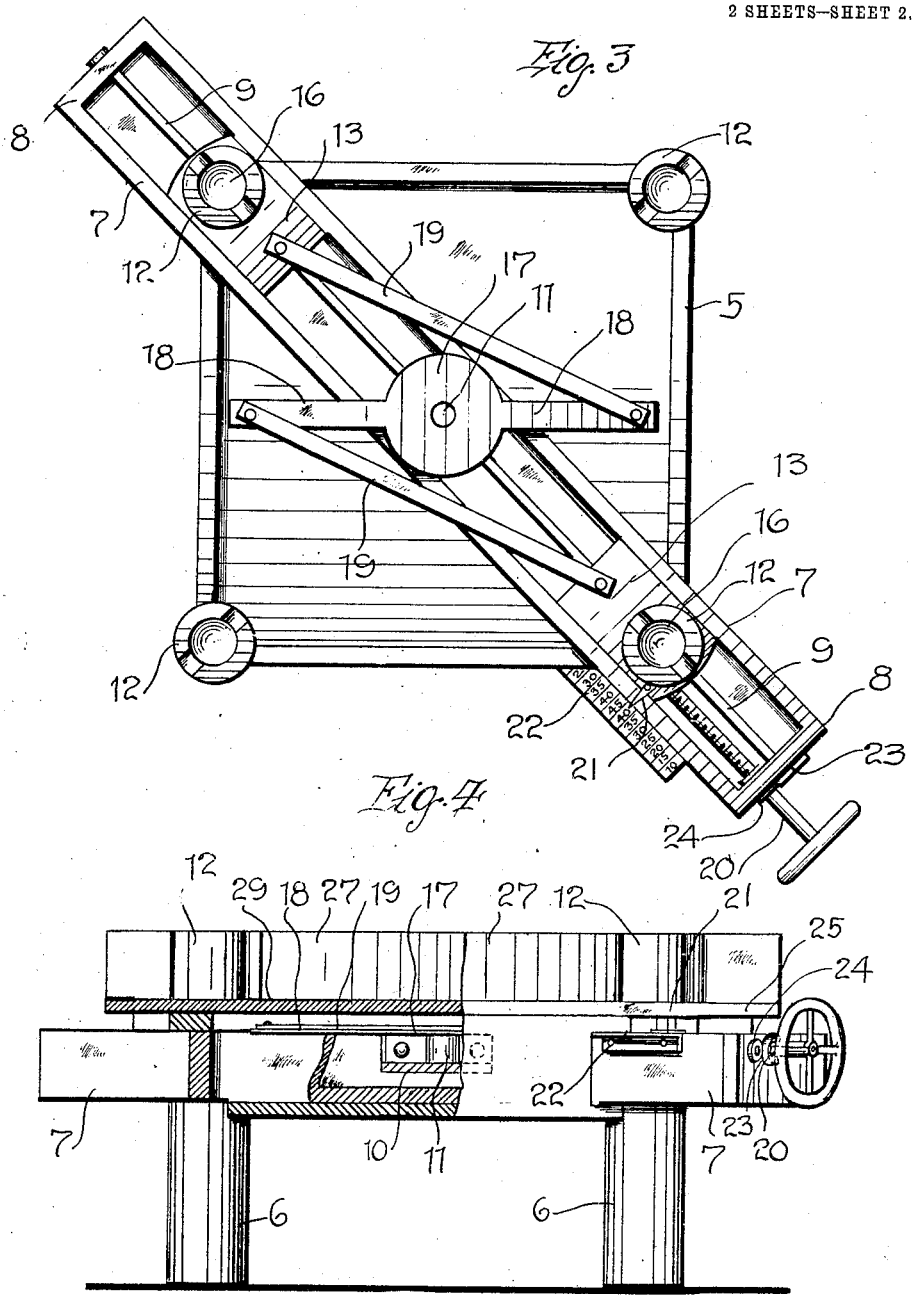

LORENZO D. FLETCHER, OF HONAKER, VIRGINIA.

MITER-BOX.

1,097,795.  Specification of Letters Patent.  Patented May 26, 1914.

Application filed March 21, 1913. Serial No. 756,049.

*To all whom it may concern:*

Be it known that I, LORENZO D. FLETCHER, citizen of the United States, residing at Honaker, in the county of Russell and State of Virginia, have invented certain new and useful Improvements in Miter-Boxes, of which the following is a specification, reference being had to the accompanying drawings.

This invention relates to improvements in miter boxes and has for its primary object to provide a comparatively simple device of this character whereby the material to be sawed may be easily and quickly adjusted in the box in order to cut the same at a desired angle.

Another object of the invention resides in the provision of a plurality of saw guides defining the corners of a parallelogram, means for moving one pair of said saw guides inwardly or outwardly from a common center, and additional material holding means arranged upon and movable with relation to said saw guides.

A still further object of the invention is to produce a device of the above character which is extremely strong and durable in construction, reliable and efficient in operation and may be manufactured at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a top plan view of a miter box embodying the present invention; Fig. 2 is a section taken on the line 2—2 of Fig. 1; Fig. 3 is a top plan view, the work table and material positioning members being removed. Fig. 4 is a side elevation, partly in section.

Referring in detail to the drawings, 5 designates a rectangular metal frame which is supported at its corners by means of the legs or standards 6. The diagonally opposed corners of this frame are connected by the parallel guide bars 7, said guide bars extending for some distance beyond the corners of the frame as clearly shown in Fig. 3. These bars at their ends are connected by the plates 8 in which the ends of a rectangular guide rod 9 are fixed. The parallel bars 7 are also connected midway between their ends by a bearing plate 10 with which the pivot stud 11 is integrally formed. The other diagonally opposed corners of the frame 5 are provided with stationary saw guides 12, said saw guides having the usual saw blade receiving recesses and being of tubular form, to receive the post of the saw frame. Between the parallel bars 7 the slides 13 are mounted, said slides being provided upon their side walls with ribs 14 to be received in channels or grooves 15 formed in the inner faces of the guide bars 7. These slides also carry tubular saw guides 16. Upon the pivot stud 11, the plate 17 is journaled for rotative movement and is provided with oppositely extending arms 18, to which the inner ends of the link bars 19 are pivotally connected. The other or outer ends of these link bars are pivotally mounted upon the respective slide members 13. The slides are provided with longitudinal openings to loosely receive the guide rod 9. The adjusting screw 20 is rotatably mounted in one of the plates 8 connecting the ends of the guide bars 7, said screw having threaded engagement in one of the slides 13. This slide carries a pointer or finger 21 which is movable over the graduated surface of a scale plate 22 fixed to the frame. Upon the plate 8, a cam lever 23 is pivotally mounted and is adapted for binding engagement with a collar 24 fixed upon the adjusting screw 21 whereby said screw may be held in its adjusted position against turning movement.

25 designates the work positioning bars. These bars are arranged upon opposite sides of the frame 5 and at one of their ends are loosely mounted upon the movable saw guides 16. Each of said bars adjacent its other end is provided with a longitudinal slot 26 through which one of the stationary saw guides 12 extends, whereby said bar may be moved freely upon said saw guides with respect thereto when the movable saw guides are adjusted. Each of the bars 25 is provided adjacent its inner edge with a vertical flange 27 for engagement with one edge of the board to be sawed. These flanges are recessed at spaced points as indicated at 28 to accommodate the movable and stationary saw guides and permit of movement of the clamping members with respect thereto.

Upon the frame 5, the work supporting table 29 is secured. The longitudinal edges of this table intermediate of its ends are obliquely cut in parallel relation as shown at 30 to accommodate the movable or sliding saw guides 16 and the work clamping bars 25. From the ends of these obliquely disposed edges 30 of the table, the remaining longitudinal edge portions thereof are angularly cut in relatively opposite directions as shown at 31 and 32 respectively. The cut away corners of the table indicated by the angular edges 31 accommodate the vertically disposed clamping flanges 27 in the turning movement of the bar 25 upon the stationary saw guides 12. These flanges extend above the upper surface of the table 29 and the work is held in engagement therewith while the same is being mitered.

From the foregoing description, the construction and manner of operation of the device will be clearly understood. As shown in Fig. 3 of the drawings, the sliding knees 16 are set for a cut of forty-five degrees, and in order to cut the material at a less angle, the knees 16 are moved inwardly toward the central pivot stud 11 by turning the adjusting screw 20, it being understood that the saw is mounted in said stationary knees. When the knees 16 are so disposed, the angle to which the material will be cut with the saw in the knees 16 would be double that indicated upon the scale plate 22. For instance, assuming that the sliding knee has been moved inwardly, so that the pointer 21 indicates 30 degrees upon the scale plate, the material will be cut at an angle of sixty degrees when the saw is disposed in the knees 16 and at an angle of thirty degrees when the same is mounted in the stationary knees 12. The reverse is the case when the sliding knees are adjusted outwardly beyond the forty-five degree mark. If desired, the graduations need be extended only inwardly from the forty-five degree mark and the outward adjustment of the knees 16 eliminated. It is obvious, that in the movement of the knees 16, the material held against the bar 25 is also moved, the slotted ends of the clamping bars moving longitudinally upon the stationary knees 12. In this manner, it will be seen that the work may be properly adjusted upon the supporting table 29 so as to cut the same at the desired angle.

By means of my improved miter box, considerable time and labor is saved in the mitering of the work. Owing to the fact that but comparatively few parts are employed in the construction of the device, it will be appreciated that the same can be produced at small manufacturing cost and is highly durable and efficient in practical use.

While I have shown and described the preferred construction and arrangement of the several elements employed, it will be understood that the invention is susceptible of considerable modification therein without departing from the essential features or sacrificing any of the advantages thereof.

Having thus described the invention, what is claimed is:

A miter box comprising a frame, parallel guide bars extended diagonally across the frame, slides mounted between the guide bars and adapted to move toward and from each other, means operatively connected with one of the slides capable of operation to recurrently move the same, means operatively connected with both of the slides whereby the movement imparted to the one slide will cause a simultaneous movement of the second slide but in a reverse direction, saw guides carried by the slides, stationary saw guides carried by the frame, positioning bars pivotally supported by the saw guide of each slide and in slidable engagement with the adjacent stationary saw guide, and a work table interposed between the positioning bars and disposed above the guide bars.

In testimony whereof I hereunto affix my signature in the presence of two witnesses.

LORENZO D. FLETCHER.

Witnesses:
M. C. LYDDANE,
CHAS. M. BIRCKHEAD.